(12) United States Patent
Zhang et al.

(10) Patent No.: US 12,437,426 B2
(45) Date of Patent: Oct. 7, 2025

(54) IMAGE REGISTRATION METHOD AND MODEL TRAINING METHOD THEREOF

(71) Applicant: GE Precision Healthcare LLC, Waukesha, WI (US)

(72) Inventors: Chen Zhang, Guangzhou (CN); Zhoushe Zhao, Beijing (CN); Yingbin Nie, Guangzhou (CN)

(73) Assignee: GE Precision Healthcare LLC, Waukesha, WI (US)

( * ) Notice: Subject to any disclaimer, the term of this patent is extended or adjusted under 35 U.S.C. 154(b) by 0 days.

(21) Appl. No.: 18/538,489

(22) Filed: Dec. 13, 2023

(65) Prior Publication Data

US 2024/0119611 A1  Apr. 11, 2024

Related U.S. Application Data

(62) Division of application No. 17/343,017, filed on Jun. 9, 2021, now Pat. No. 11,880,988.

(30) Foreign Application Priority Data

Jun. 11, 2020  (CN) .......................... 202010530181.4

(51) Int. Cl.
  *G06T 7/33* (2017.01)
  *G06T 3/4007* (2024.01)
  *G06T 7/32* (2017.01)
(52) U.S. Cl.
  CPC ............ *G06T 7/337* (2017.01); *G06T 3/4007* (2013.01); *G06T 7/32* (2017.01); *G06T 2207/20081* (2013.01)

(58) Field of Classification Search
  CPC ......... G06T 7/337; G06T 3/4007; G06T 7/32; G06T 2207/20081; G06T 3/14;
  (Continued)

(56) References Cited

U.S. PATENT DOCUMENTS 8,073,220 B2   12/2011  Khamene
2007/0047840 A1  3/2007  Xu
(Continued)

FOREIGN PATENT DOCUMENTS

CN    105913442 A   8/2016
CN    104021547 A   2/2017
(Continued)

*Primary Examiner* — Chan S Park
*Assistant Examiner* — Daniel C Chang

(57) ABSTRACT

The present disclosure relates to an image registration method and a model training method thereof. The image registration method comprises obtaining a reference image and a floating image to be registered, performing image preprocessing on the reference image and the floating image, performing non-rigid registration on the preprocessed reference image and floating image to obtain a registration result image, and outputting the registration result image. The image preprocessing comprises performing, on the reference image and the floating image, coarse-to-fine rigid registration based on iterative closest point registration and mutual information registration. The non-rigid registration uses a combination of a correlation coefficient and a mean squared error between the reference image and the registration result image as a loss function.

3 Claims, 7 Drawing Sheets

(58) Field of Classification Search
CPC . G06T 2207/10081; G06T 2207/10088; G06T 2207/10104; G06T 2207/10108; G06T 2207/20004; G06T 2207/20084; G06T 2207/20132; G06T 2207/30061; G06T 2207/30096; G06T 7/0014; G06T 7/30; G06T 7/35; G06T 7/344; G06T 7/10; G06N 3/08; G06N 3/045
See application file for complete search history.

(56) References Cited

U.S. PATENT DOCUMENTS

| | | |
|---|---|---|
| 2011/0150312 A1 | 6/2011 | Takanami |
| 2016/0180528 A1 | 6/2016 | Reynolds |
| 2016/0292864 A1 | 10/2016 | Dabbah |
| 2017/0301080 A1* | 10/2017 | Yan .................. G06T 7/337 |
| 2021/0065360 A1 | 3/2021 | Laaksonen |
| 2023/0114934 A1 | 4/2023 | Liao |

FOREIGN PATENT DOCUMENTS

| | | | | |
|---|---|---|---|---|
| CN | 108416802 A | * | 8/2018 | ........... G06N 3/0454 |
| CN | 109754396 A | * | 5/2019 | ............... G06T 7/00 |
| CN | 110570426 A | | 12/2019 | |
| CN | 110838139 A | * | 2/2020 | ........... G06T 7/0012 |
| CN | 107103618 A | | 10/2020 | |
| JP | 2016116867 A | | 6/2016 | |

* cited by examiner

IMAGE REGISTRATION METHOD AND MODEL TRAINING METHOD THEREOF

CROSS-REFERENCE TO RELATED APPLICATIONS

This application is a divisional of U.S. application Ser. No. 17/343,017, filed on Jun. 9, 2021, which claims priority to Chinese Application No. 202010530181.4, filed on Jun. 11, 2020, the disclosures of which are incorporated herein by reference in its entirety.

TECHNICAL FIELD

The present disclosure relates to the technical field of image processing, and more specifically, to an image registration method and a model training method thereof.

BACKGROUND

Image registration is the basis of researches on, for example, image fusion, image reconstruction, matching of an image with a standard map, and quantitative image analysis. Image registration enables corresponding points of two images to be consistent in spatial position and anatomical position under a given similarity measurement by means of an optimal spatial transformation. The image registration plan can sufficiently utilize various information contained in images of different time, different modalities, or different sequences, and provide a basis for subsequent advanced image analysis (for example, medical efficacy evaluation, image-guided therapy, multi-sequence image segmentation, and merge of different modalities). Image registration may be divided into rigid registration and non-rigid registration depending on the transformation mode. Rigid registration means that the distance between any two points in an image remains unchanged before and after transformation, except that translation and rotation of coordinate axes occur. Rigid registration applies only to registration without deformation or rigid bodies. Rigid registration cannot meet clinical needs in many cases. Since many deformations are non-rigid and non-linear in nature, many important clinical applications need non-rigid transformation to describe a spatial relationship between images. At present, conventional rigid registration methods and non-rigid registration methods have some problems to be solved, for example, poor applicability: a method or a set of parameters applies only to a specific modality or even a specific data set; slow processing speed: since optimal parameters are searched for using iterative optimization in conventional registration methods, slow processing speed is caused, and it is difficult to apply the methods to real-time scenarios; or poor precision due to local extrema.

For example, lung cancer is one of the most common malignancies in the world, having the highest morbidity and mortality among malignancies and recognized as a killer of human health. Immunotherapy is a treatment that remodels the immune system of a tumor patient to kill tumor cells. Due to its small toxic and side effects and long-lasting efficacy, immunotherapy has been used in lung cancer treatment. In addition, objectively and precisely evaluating the efficacy of tumor treatment is of important clinical significance in which imaging examination such as CT and MR plays an important role. The efficacy of immunotherapy was evaluated for imaging examination, and the RECIST Working Group and the Immunotherapy Subcommittee thereof published the iRecist standard in 2017. In order to use iRecsit or other response evaluation criteria to precisely and quantitatively evaluate the efficacy, an effective image registration method is an essential link. However, affected by the complex nature of image data after immunotherapy and the irregular deformation caused by the spontaneous movement of lung organs, existing image registration methods need to be improved in precision and efficiency of completing image registration.

Accordingly, there is a need in the art for an improved image registration method.

SUMMARY

In one aspect of the present disclosure, an image registration method is provided. The method may comprise: obtaining a reference image and a floating image to be registered; performing image preprocessing on the reference image and the floating image, wherein the image preprocessing may comprise rigid registration based on iterative closest point registration and mutual information registration; performing non-rigid registration on the preprocessed reference image and the preprocessed floating image to obtain a registration result image; and outputting the registration result image.

In another aspect of the present disclosure, a rigid registration method for images based on iterative closest point registration and mutual information registration is provided. The method may comprise: performing coarse registration about contour point data sets on a reference image and a floating image to be registered by using iterative closest point registration, so as to obtain first transformation parameters; optimizing registration between the reference image and the floating image by using mutual information registration based on the first transformation parameters, so as to obtain second transformation parameters; and registering the reference image and the floating image based on the second transformation parameters.

In yet another aspect of the present disclosure, a method for training a non-rigid registration model for images is provided. The method may comprise: inputting a preprocessed reference image and a preprocessed floating image to a U-Net to obtain spatial transformation parameters; inputting the spatial transformation parameters to a spatial transformation network, and performing spatial transformation and an interpolation operation on the preprocessed floating image, so as to obtain a registration result image; calculating a loss function value between the reference image and the registration result image by using a loss function, wherein the loss function may comprise both a correlation coefficient and a mean squared error between the reference image and the registration result image; and repeating the aforementioned steps a predetermined number of times for iterative training or until the non-rigid registration model converges.

In yet another aspect of the present disclosure, a computer-readable medium is provided, having instructions thereon, wherein when executed by a processor, the instructions cause the processor to perform the steps of any of the methods described above.

In yet another aspect of the present disclosure, an image registration apparatus is provided, wherein the image registration apparatus may comprise a device for implementing the steps of any of the methods described above.

In yet another aspect of the present disclosure, a system for image registration is provided. The system may comprise: a medical imaging apparatus, the medical imaging apparatus being configured to perform an imaging scan to generate a medical image; a storage apparatus, the storage apparatus being configured to store the medical image; and a medical imaging workstation or a medical image cloud platform analysis system, wherein the medical imaging workstation or the medical image cloud platform analysis system may be communicatively connected to the storage apparatus and comprise a processor, the processor may be configured to perform the steps of any of the methods described above.

These and other features and aspects of the present disclosure will become clearer through the detailed description with reference to the drawings below.

BRIEF DESCRIPTION OF THE DRAWINGS

To obtain a better understanding of the present disclosure in detail, please refer to the embodiments for a more detailed description of the present disclosure as briefly summarized above. Some embodiments are illustrated in the drawings. In order to facilitate a better understanding, the same symbols have been used as much as possible in the figures to mark the same elements that are common in the various figures. It should be noted, however, that the drawings only illustrate the typical embodiments of the present disclosure and should therefore not be construed as limiting the scope of the present disclosure as the present disclosure may allow other equivalent embodiments. In the figures.

Figure 1:
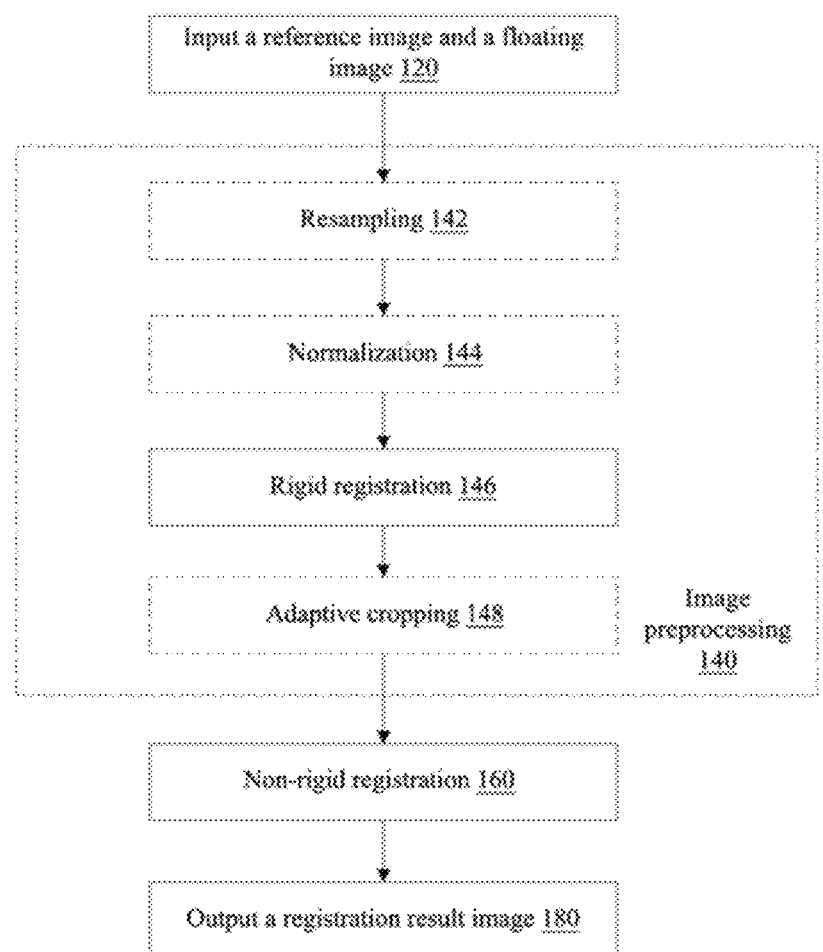
FIG. 1 schematically shows an exemplary flowchart of an image registration method according to an embodiment of the present disclosure.

It can be expected that the elements in one embodiment of the present disclosure may be advantageously applied to the other embodiments without further elaboration.

DETAILED DESCRIPTION OF THE EMBODIMENTS

Specific embodiments of the present disclosure will be described below. It should be noted that in the specific description of the embodiments, in order to enable a concise description, it is impossible to provide exhaustive detailed description on all features of the actual embodiments in this specification. It should be understood that in the actual implementation of any of the embodiments, as in the process of any engineering project or design project, a variety of specific decisions are often made in order to achieve the developer's specific objectives and meet system-related or business-related restrictions, which will vary from one embodiment to another. Moreover, it can also be understood that although the efforts made in such development process may be complex and lengthy, for those of ordinary skill in the art related to content disclosed in the present disclosure, some changes in design, manufacturing, production or the like based on the technical content disclosed in the present disclosure are only conventional technical means. The content of the present disclosure should not be construed as insufficient.

Unless otherwise defined, the technical or scientific terms used in the claims and the specification are as they are usually understood by those of ordinary skill in the art to which the present disclosure pertains. The words "first," "second" and similar words used in the specification and claims of the patent application of the present disclosure do not denote any order, quantity or importance, but are merely intended to distinguish between different constituents. "One," "a(n)" and similar words are not meant to be limiting, but rather denote the presence of at least one. The word "include," "comprise" or a similar word is intended to mean that an element or article that appears before "include" or "comprise" encompasses an element or article and equivalent elements that are listed after "include" or "comprise," and does not exclude other elements or articles. The word "connect," "connected" or a similar word is not limited to a physical or mechanical connection, and is not limited to a direct or indirect connection.

The images described herein may be images of various objects including, but not limited to, images of anatomical structures (such as lungs and chests) of human patients and animals, articles (such as parts), or various foreign objects (such as dental implants, stents, or contrast agents) existing in the body. Further, the images described herein may be images of various modalities including, but not limited to, images generated by a computed tomography (CT) apparatus, a magnetic resonance imaging (MRI) apparatus, a C-arm imaging apparatus, a positron emission tomography (PET) apparatus, a single photon emission computed tomography (SPECT) apparatus, or any other suitable imaging apparatus. The embodiments of the present disclosure can realize precise and efficient image registration with high applicability between images of different time, different modalities, or different sequences.

In the embodiments of the present disclosure, the "contour point data set" of an image refers to a data set of all pixels on an outer contour of a target object (such as a lung organ) in the image. The term "iterative closest point registration" used herein refers to image registration based on an iterative closest point algorithm, and "mutual information registration" refers to image registration based on a mutual information algorithm.

Now referring to FIG. 1, FIG. 1 shows a flowchart of an exemplary image registration method 100 according to an embodiment of the present disclosure. The image registration method 100 starts at step 120. In step 120, a reference image and a floating image to be registered may be obtained. In various embodiments of the present disclosure, the reference image may be an image selected from various obtained images (such as images of different periods, different modalities, or different sequences) of an object to serve as a reference for image registration. For example, in registering CT images of the same patient scanned at different periods, the image of the first scan is usually selected as the reference image.

Then, in step 140, the image registration method 100 may include performing image preprocessing on the obtained reference image and floating image. In an embodiment, the preprocessing of the reference image and the floating image may be performed at the same time. The image preprocessing described herein is a consistent preprocessing process for the reference image and the floating image in terms of operation steps, operation parameters, and so on, for example, using the same pixel pitch and the same normalization equation. In this way, the problem of poor registration caused by the complex nature of image data (such as medical images obtained from medical imaging scans of patients or other objects subjected to immunotherapy) or different qualities of images acquired by different apparatuses can be alleviated or eliminated, thereby improving the applicability of the image registration method described herein.

The image preprocessing 140 may include performing rigid registration 146 on the reference image and the floating image. The rigid registration may typically include iterative closest point (ICP)-based rigid registration and mutual information (MI)-based rigid registration. The conventional iterative closest point-based rigid registration performs matching only on contour point data sets of the reference image and the floating image, and a small amount of data is calculated. Thus, the registration has high speed but relatively low precision. Moreover, the conventional mutual information-based rigid registration performs a plurality of iterative searches for optimal transformation parameters, and a joint distribution of the reference image and the floating image needs to be repeatedly calculated in the process of search and calculation. Thus, the registration has high precision, but has problems of being time-consuming and easily falling into local extrema. In the rigid registration method based on iterative closest point and mutual information described herein, transformation parameters output in iterative closest point registration are used as initial values of mutual information registration to combine the two to achieve coarse-to-fine rigid registration of the images. The transformation parameters obtained through iterative closest point registration are used as the initial values of mutual information search, so that the search range of globally optimal transformation parameters can be significantly narrowed to avoid falling into local extrema, thereby achieving the purpose of improving registration precision; besides, the number of searches can be reduced in this manner to achieve the purpose of increasing registration speed. An exemplary rigid registration method 200 for images incorporating iterative closest point-based registration and mutual information-based registration according to an embodiment of the present disclosure is described in more detail below with reference to FIG. 2.

The rigid registration method 200 for images based on iterative closest point and mutual information starts at step 230. In this step, the rigid registration method 200 may include performing coarse registration about contour point data sets on a reference image and a floating image to be registered by using iterative closest point registration, so as to obtain first transformation parameters, as shown in block 230 of FIG. 2.

In some embodiments, the respective contour point data sets of the reference image and the floating image may be extracted through a marching cubes (MC) algorithm. In some embodiments, the first transformation parameters may be three-dimensional transformation parameters. In a three-dimensional embodiment, the first transformation parameters may include a pixel translation amount in an x-axis direction, a pixel translation amount in a y-axis direction, a pixel translation amount in a z-axis direction, a central rotation angle in an axial plane (xy plane), a central rotation angle in a sagittal plane (xz plane), and a central rotation angle in a coronal plane (yz plane). In some other embodiments, the first transformation parameters may be two-dimensional transformation parameters. In a two-dimensional embodiment, the first transformation parameters may include a pixel translation amount in an x-axis direction, a pixel translation amount in a y-axis direction, and a central rotation angle in an xy plane.

Figure 2:
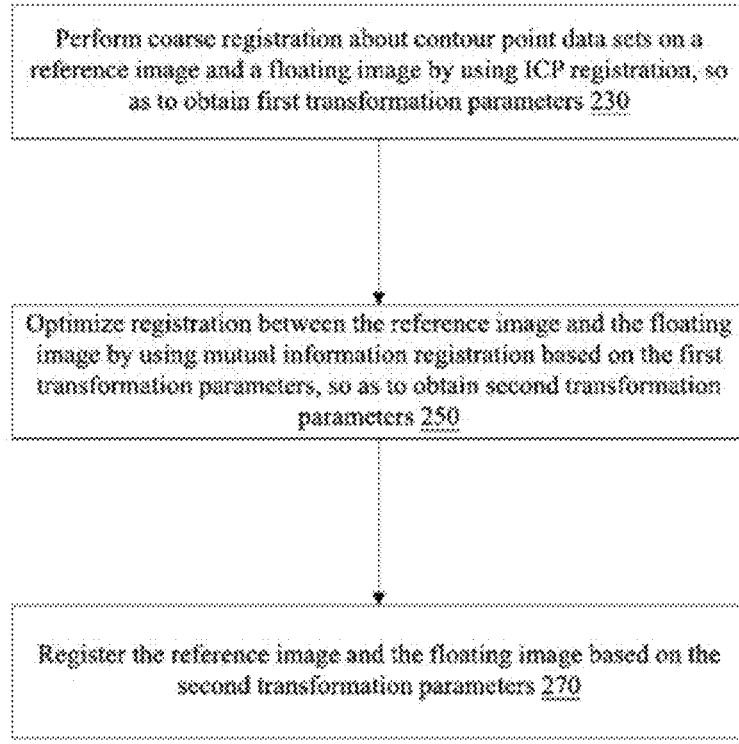
FIG. 2 schematically shows an exemplary flowchart of a rigid registration method for images based on iterative closest point registration and mutual information registration according to an embodiment of the present disclosure.

In the embodiment of the present disclosure, after the iterative closest point registration, as shown in block 250 of FIG. 2, the rigid registration method 200 may include optimizing registration between the reference image and the floating image by using mutual information registration based on the first transformation parameters, so as to obtain second transformation parameters.

Specifically, in the embodiment, spatial transformation may be performed on the floating image first by using the obtained first transformation parameters as initial values of mutual information registration. The spatial transformation performed on the floating image can align overall contours of the floating image and the reference image. In an example, the spatial transformation may include a translation operation and/or a rotation operation on the floating image. The translation operation may include translation operations of the floating image in the x-, y- and/or z-axis direction. The rotation operation may include rotation operations of the floating image in the axial plane (xy plane), sagittal plane (xz plane), and/or coronal plane (yz plane).

After the spatial transformation, an interpolation operation may be performed on the floating image. In an embodiment, the interpolation operation performed on the floating image may be, for example, nearest neighbor interpolation, partial volume (PV) interpolation, linear interpolation, B-spline interpolation, bilinear interpolation, and/or bicubic interpolation.

The mutual information registration may then further include calculating a mutual information value between an obtained interpolation result and the reference image, so as to obtain the second transformation parameters corresponding to the mutual information value. Like the first transformation parameters, in some embodiments, the second transformation parameters may also be three-dimensional transformation parameters. In a three-dimensional embodiment, the second transformation parameters may include a pixel translation amount in an x-axis direction, a pixel translation amount in a y-axis direction, a pixel translation amount in a z-axis direction, a central rotation angle in an axial plane (xy plane), a central rotation angle in a sagittal plane (xz plane), and a central rotation angle in a coronal plane (yz plane). In some other embodiments, the second transformation parameters may be two-dimensional transformation parameters. In a two-dimensional embodiment, the second transformation parameters may include a pixel translation amount in an x-axis direction, a pixel translation amount in a y-axis direction, and a central rotation angle in an xy plane.

After the mutual information registration is performed, the rigid registration method 200 may include registering the reference image and the floating image based on the obtained second transformation parameters, as shown in block 270 of FIG. 2.

In a preferred embodiment of the present disclosure, the rigid registration method 200 based on iterative closest point registration and mutual information registration may include, after the mutual information registration is performed, determining whether the calculated mutual information value converges or whether the iterative closest point registration and the mutual information registration are repeatedly performed a predetermined number of times. The "mutual information value converges" mentioned herein refers to that a difference between the mutual information value calculated in the current execution of the iterative closest point registration and mutual information registration and a mutual information value calculated in the previous execution is less than or equal to a predetermined threshold. The predetermined threshold may be, for example, 0.001. In addition, in the embodiment, the predetermined number of times for repetition may be in the range of 400 to 800, for example, 450, 500, 550, 600, 650, 700, or 750.

If the result of the determination is "No," the rigid registration method 200 may return to step 230 through stochastic gradient descent. If the result of the determination is "Yes," the rigid registration method 200 may include outputting the second transformation parameters to perform step 270.

Now referring back to FIG. 1, the image preprocessing step 140 of the image registration method 100 may optionally (thus shown in dashed boxes) include performing operations of resampling 142 and/or normalization 144 on the reference image and the floating image before the rigid registration 146 based on iterative closest point registration and mutual information registration is performed thereon.

The resampling 142 enables the reference image and the floating image to have the same pixel pitch. In an embodiment, the pixel pitch of the reference image and the floating image may be resampled to 1*1*1 through the resampling 142. In an embodiment, the resampling 142 may use, for example, nearest neighbor interpolation, partial volume (PV) interpolation, linear interpolation, B-spline interpolation, bilinear interpolation, and/or bicubic interpolation.

The normalization 144 can eliminate negative effects of singular pixels. After the normalization, pixel values of the image may fall into a standard normal distribution with a mean of 0 and a variance of 1. In an embodiment, the normalization 144 of both the reference image and the floating image may be performed based on the following equation (1):

$$x_{norm} = \frac{x - x_{min}}{x_{max} - x_{min}}, \quad (1)$$

where $x_{norm}$ is a normalized pixel value, x is an original pixel value, and $x_{min}$ and $x_{max}$ are respectively a minimum pixel value and a maximum pixel value in the original image.

As shown in FIG. 1, after the rigid registration 146, the image preprocessing step 140 may optionally further include performing adaptive cropping 148 on the reference image and the rigidly registered floating image. The adaptive cropping 148 can reduce interference from edge background information of the images, thereby improving the precision of image registration. Further, since the rigid registration can align the overall contours of the reference image and the floating image, edge portions common to the reference image and the floating image can be removed by performing adaptive cropping after the rigid registration. If cropping is performed before the rigid registration, non-edge portions of the images may be cropped out.

In an embodiment, for images of an object such as an anatomical structure (for example, the lung, chest, or abdomen), the adaptive cropping 148 may position a contour of a target object in the reference image and the rigidly registered floating image through a semi-automatic or automatic segmentation method. The semi-automatic or automatic segmentation method may be a deep learning-based segmentation method. Then, an opening operation may be performed on the contour of the target object to remove isolated points. After the opening operation, a minimum bounding box of the contour of the target object may be calculated. In an example of three-dimensional images, the minimum bounding box may be a three-dimensional bounding box, for example, a minimum cube bounding box.

The minimum bounding box may then be automatically expanded to a desired size, so as to obtain a reference image and a floating image that are cropped based on the desired size. The desired size enables the cropped reference image and floating image to be suitable for input to a non-rigid registration model. This is because the non-rigid registration model has size requirements for an input image and the size of the minimum bounding box may not meet such requirements, and thus the minimum bounding box generally cannot be directly input to the non-rigid registration model. For example, in an exemplary non-rigid registration model where a U-Net contains four convolutional downsampling layers, the size of the image may be reduced to half of the original size each time convolution is performed per layer. As a result, the cropped reference image and floating image cannot be input to the U-Net if the size of each dimension of the minimum bounding box is not expanded to a multiple of $2^4$ (namely, 16). In this example, each dimension of the minimum bounding box may preferably be expanded to a first reached multiple of 16. For example, an exemplary minimum bounding box is 278 pixels*273 pixels*236 pixels, which may have a desired size of 288 pixels*288 pixels*240 pixels. In other embodiments, for example, when the U-Net contains two convolutional layers, the size of each dimension of the minimum bounding box may be expanded to a multiple of $2^2$ (namely, 4); as another example, when the U-Net contains eight convolutional layers, the size of each dimension of the minimum bounding box may be expanded to a multiple of $2^8$ (namely, 256).

After the image preprocessing 140, the image registration method 100 may perform non-rigid registration on the preprocessed reference image and floating image in step 160. Rigid registration of images can achieve coordinate alignment, while non-rigid registration can solve deformation problems. In some embodiments, the non-rigid registration 160 uses an unsupervised model of a deep learning-based U-Net and a spatial transformation network (STN). Specifically, the non-rigid registration 160 may include inputting the preprocessed reference image and the preprocessed floating image to the U-Net to obtain spatial transformation parameters, and then inputting the obtained spatial transformation parameters to the spatial transformation network (STN), and performing spatial transformation and an interpolation operation on the preprocessed floating image, so as to obtain a registration result image. The spatial transformation parameters may also be referred to as a deformation field. The spatial transformation in the process of rigid registration 160 can realize fine registration between the reference image and the floating image. In an embodiment, the spatial transformation may include a translation operation on the preprocessed floating image. The translation operation may include translation operations of various pixels of the floating image in the x-, y-, and/or z-axis directions. In an embodiment, the interpolation operation performed on the preprocessed floating image may be, for example, bilinear interpolation.

Figure 3:
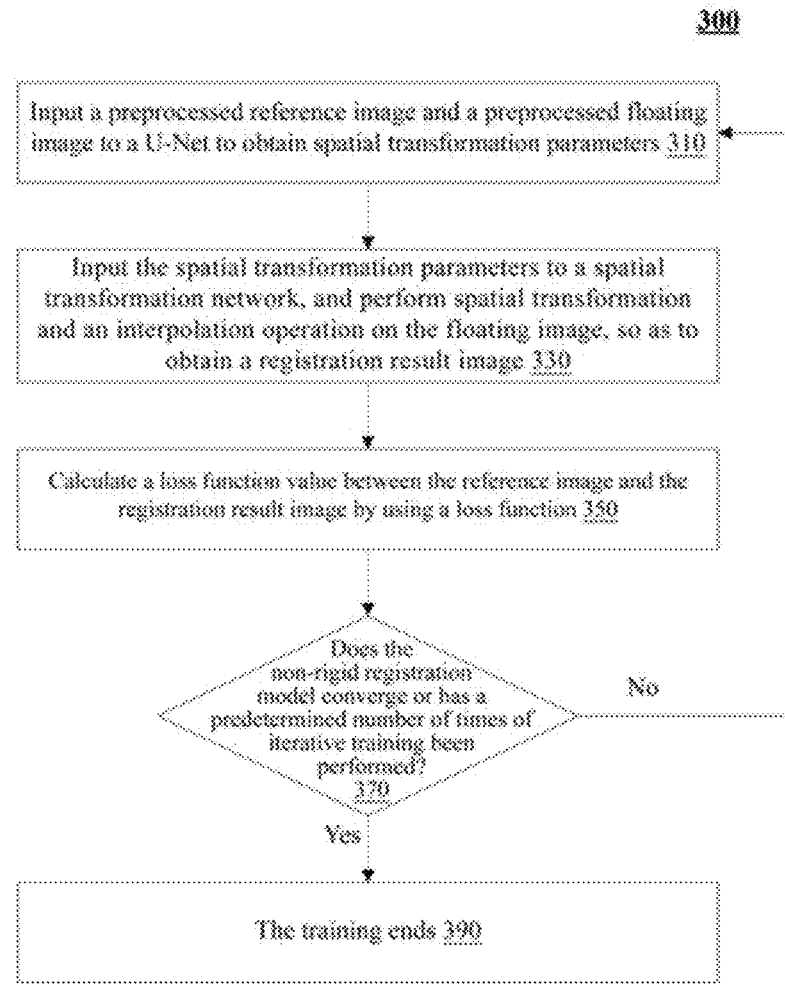
FIG. 3 schematically shows an exemplary flowchart of a method for training a non-rigid registration model for images according to an embodiment of the present disclosure.

In the embodiment of the present disclosure, the model used in the non-rigid registration process may be trained before the non-rigid registration 160 is performed. An exemplary method 300 for training a non-rigid registration model for images according to an embodiment of the present disclosure is described in more detail below with reference to FIG. 3.

The model training method 300 starts at step 310. In step 310, a preprocessed reference image and a preprocessed floating image may be input to a U-Net to obtain spatial transformation parameters. Then, in step 330, the obtained spatial transformation parameters may be input to a spatial transformation network (STN), and spatial transformation and an interpolation operation are performed on the preprocessed floating image, so as to obtain a registration result image. In an embodiment, the spatial transformation may include a translation operation on the preprocessed floating image. The translation operation may include translation operations of various pixels of the floating image in the x-, y-, and/or z-axis directions. In an embodiment, the interpolation operation performed on the preprocessed floating image may be, for example, bilinear interpolation.

Then, in step 350, a loss function value between the obtained registration result image and the reference image may be calculated by using a loss function. The loss function used herein is based on linearly dependent changes between images. In the case where the loss function includes only a correlation coefficient between the reference image and the registration result image, the trained model can hardly achieve a satisfactory registration result for images with large deformation. The inventor found that the deficiency can be effectively compensated for by a mean squared error between the reference image and the registration result image. Thus, the loss function of the present disclosure includes both the correlation coefficient and the mean squared error between the reference image and the registration result image, so that the difference between the output registration result and the reference image can be better measured during training of the non-rigid registration model, thereby improving the performance of the non-rigid registration model. In an embodiment, the loss function may be represented by the following equation (2):

$$L = \alpha \frac{\frac{1}{N-1}\sum_{i=0}^{N-1}(F_i - F')(T_i - T')}{\sqrt{\frac{1}{N-1}\sum_{i=0}^{N-1}(F_i - F')^2}\sqrt{\frac{1}{N-1}\sum_{i=0}^{N-1}(T_i - T')^2}} + \beta \frac{1}{N-1}\sum_{i=0}^{N-1}(F_i - T_i)^2, \quad (2)$$

where L represents the loss function, $\alpha$ is a coefficient of the correlation coefficient between the reference image and the registration result image, $\beta$ is a coefficient of the mean squared error between the reference image and the registration result image, N is the number of pixels of the reference image and the registration result image, $F_i$ and $T_i$ are respectively values of the i-th pixels of the reference image and the registration result image, and F' and T' are respectively average pixel values of the reference image and the registration result image. In the embodiment, values of $\alpha$ and $\beta$ may be set as needed. For example, in an example, $\alpha$ may be set to 0.7, and $\beta$ may be set to 0.3.

After the loss function value is calculated, the training method 300 may include determining whether the non-rigid registration model converges or a predetermined number of times of iterative training has been performed in step 370. In the present disclosure, the model may be considered as "converged" if a difference between the loss function value calculated in the current iteration and a loss function value calculated in the previous iteration is less than or equal to a predetermined threshold. If the model has converged, it indicates that the model has learned a non-linear mapping relationship between the reference image and the floating image as desired, so as to perform non-rigid registration on the reference image and the floating image.

If the determination result in block 370 is "No," the training method 300 may return to step 310. If the determination result in block 370 is "Yes," the training may end and model parameters may be stored for use in the non-rigid registration process in the image registration process. In the embodiment, the model parameters may include values of various convolution kernels of the convolutional layers in the U-Net.

Referring back again to FIG. 1, in step 180, the image registration method 100 may include outputting a registration result image obtained through rigid registration and non-rigid registration.

The execution of the method of the present disclosure should not be limited to the sequence described above. Rather, some steps in the method of the present disclosure may be performed in a different sequence or at the same time, or in some embodiments, certain steps may not be performed. In addition, any step in the method of the present disclosure may be performed with a module, unit, circuit, or any other suitable means for performing these steps.

Figure 4A:
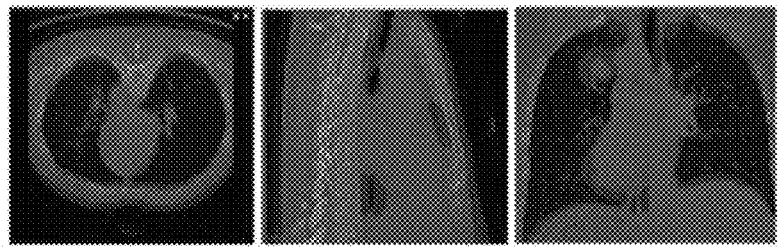
FIGS. 4A and 4B respectively schematically show exemplary fusion effects before and after image registration is performed according to an embodiment of the present disclosure.
Figure 4B:
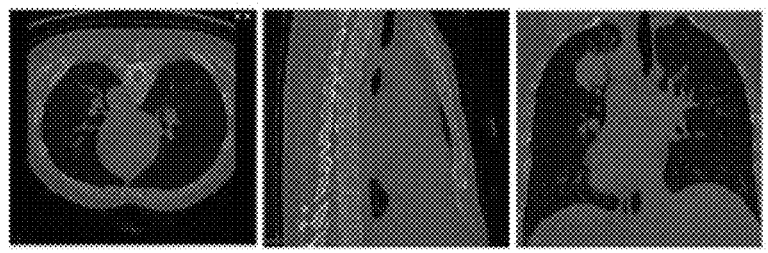
Figure 5A:
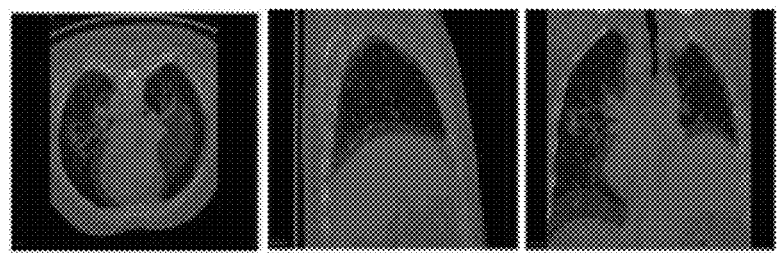
FIGS. 5A and 5B respectively schematically show exemplary fusion effects before and after image registration is performed according to another embodiment of the present disclosure.
Figure 5B:
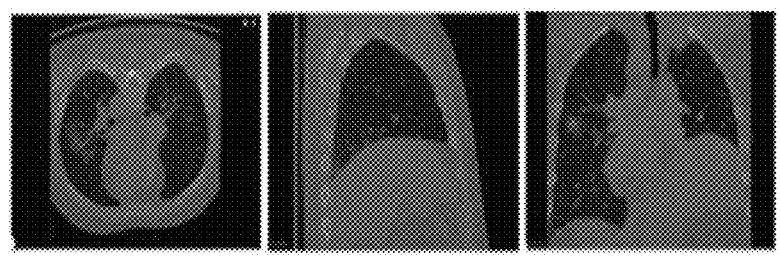

FIG. 4A and FIG. 5A show image fusion effects of two sets of test images before the image registration method described herein is performed. FIG. 4B and FIG. 5B show image fusion effects of the two sets of test images after the image registration method described herein is performed. It can be seen that the precision of image registration can be significantly improved by using the image registration method of the present disclosure.

In addition, the following table shows a comparison between the image registration method of the present disclosure and a conventional non-rigid registration method, Demons, in respect of evaluation indexes such as mutual information, mean squared error (MSE) value, and registration time. The larger a value of mutual information and/or the smaller a value of mean squared error, the better the effects of registration. In addition, the shorter the registration time, the higher the registration efficiency.

| | Method | Mutual information | MSE | Registration time (second) |
|---|---|---|---|---|
| Test data 1 | Demons | 1.0430 | 0.2217 | 228 |
| | Present Disclosure | 1.0530 | 0.2157 | 12.5 |
| Test data 2 | Demons | 1.0621 | 0.1815 | 223 |
| | Present Disclosure | 1.1782 | 0.0760 | 11.4 |

Figure 6:
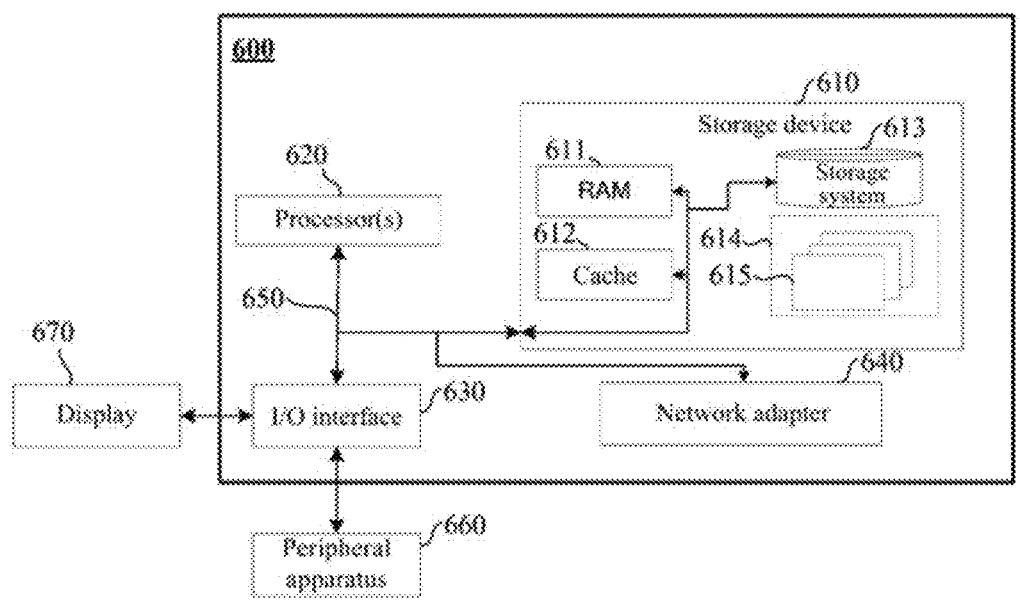
FIG. 6 schematically shows an example of an electronic apparatus for performing an image registration method according to an embodiment of the present disclosure.

FIG. 6 shows an example of an electronic apparatus 600 for performing an image registration method according to an embodiment of the present disclosure. The electronic apparatus 600 includes: one or a plurality of processors 620; and a storage device 610, configured to store one or a plurality of programs, wherein when the one or plurality of programs are executed by the one or plurality of processors 620, the one or plurality of processors 620 are caused to implement the method described herein. The processor is, for example, a digital signal processor (DSP), a microcontroller, an application-specific integrated circuit (ASIC), or a microprocessor.

The electronic apparatus 600 shown in FIG. 6 is merely an example, and should not be regarded as any limits to the function and use scope of the embodiment of the present disclosure.

As shown in FIG. 6, the electronic apparatus 600 is implemented in the form of a general-purpose computing apparatus. The components of the electronic apparatus 600 may include, but not limited to, one or a plurality of processors 620, a storage device 610, and a bus 650 connecting different system components (including the storage device 610 and the processor 620).

The bus 650 represents one or a plurality of types of bus structures, including a memory bus or a memory controller, a peripheral bus, an accelerated graphics port, a processor, or a local bus using any bus structure in the plurality of bus structures. For example, these architectures include, but not limited to, an Industrial Standard Architecture (ISA) bus, a Micro Channel Architecture (MAC) bus, an enhanced ISA bus, a Video Electronics Standards Association (VESA) local bus, and a Peripheral Component Interconnect (PCI) bus.

The electronic apparatus 600 typically includes a plurality of computer system-readable media. These media may be any available medium that can be accessed by the electronic apparatus 600, including volatile and non-volatile media as well as removable and non-removable media.

The storage device 610 may include a computer system-readable medium in the form of a volatile memory, for example, a random access memory (RAM) 611 and/or a cache memory 612. The electronic apparatus 600 may further include other removable/non-removable, and volatile/non-volatile computer system storage media. Only as an example, a storage system 613 may be configured to read/write a non-removable, non-volatile magnetic medium (not shown in FIG. 6, often referred to as a "hard disk drive"). Although not shown in FIG. 6, a magnetic disk drive configured to read/write a removable non-volatile magnetic disk (for example, a "floppy disk") and an optical disk drive configured to read/write a removable non-volatile optical disk (for example, a CD-ROM, a DVD-ROM, or other optical media) may be provided. In these cases, each drive may be connected to the bus 650 via one or a plurality of data medium interfaces. The storage device 610 may include at least one program product which has a group of program modules (for example, at least one program module) configured to perform the functions of the embodiments of the present disclosure.

A program/utility tool 614 having a group of program modules (at least one program module) 615 may be stored in, for example, the storage device 610. Such a program module 615 includes, but is not limited to, an operating system, one or a plurality of applications, other program modules, and program data. It is possible for each one or a certain combination of these examples to include implementations of a network environment. The program module 615 typically performs the function and/or method in any embodiment described in the present disclosure.

The electronic apparatus 600 may also communicate with one or a plurality of peripheral apparatuses 660 (for example, a keyboard, a pointing apparatus, and a display 670), may also communicate with one or a plurality of apparatuses enabling a user to interact with the electronic apparatus 600, and/or communicate with any apparatus (for example, a network card or a modem) enabling the electronic apparatus 600 to communicate with one or a plurality of other computing apparatuses. Such communication may be carried out via an input/output (I/O) interface 630. Moreover, the electronic apparatus 600 may also communicate with one or a plurality of networks (for example, a local area network (LAN), a wide area network (WAN) and/or a public network, for example, the Internet) through a network adapter 640. As shown in FIG. 6, the network adapter 640 communicates with other modules of the electronic apparatus 600 through the bus 650. It should be understood that although not shown in the figure, other hardware and/or software modules may be used in conjunction with the electronic apparatus 600, including but not limited to: microcode, a device drive, a redundant processing unit, an external magnetic disk drive array, a RAID system, a magnetic tape drive, a data backup storage system, and the like.

The processor 620 performs various functional applications and data processing by running the program stored in the storage device 610.

Figure 7:
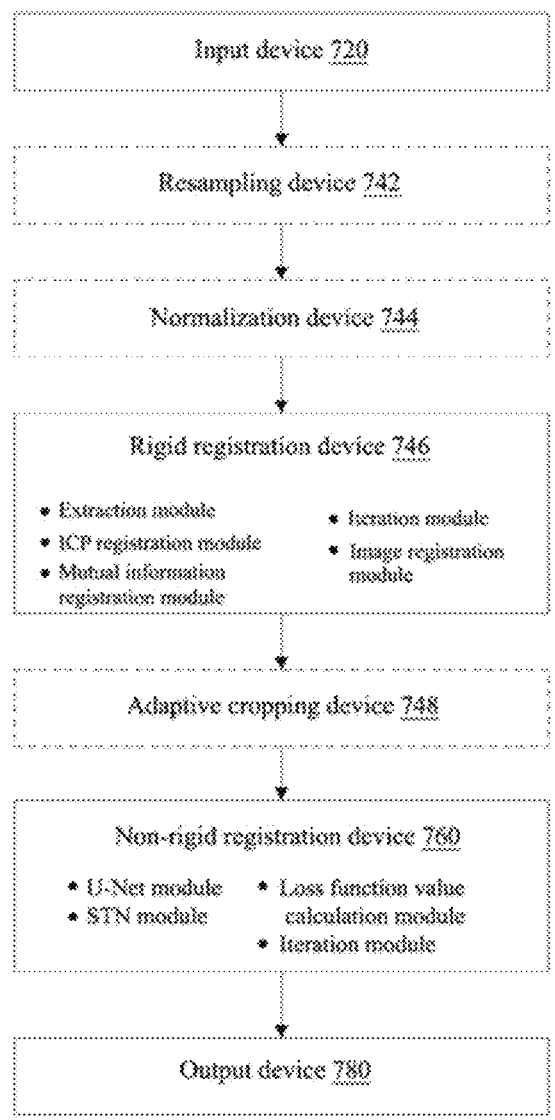
FIG. 7 schematically shows an exemplary block diagram of an image registration apparatus according to an embodiment of the present disclosure.

FIG. 7 schematically shows a block diagram of an exemplary image registration apparatus 700 according to an embodiment of the present disclosure. The image registration apparatus 700 includes an obtaining device 720, a rigid registration device 746, a non-rigid registration device 760, and an output device 780. The obtaining device 720 may be configured to obtain a reference image and a floating image to be registered. The rigid registration device 746 may be configured to perform a rigid registration method for images based on iterative closest point registration and mutual information registration described herein. The non-rigid registration device 760 may be configured to perform non-rigid registration on the preprocessed reference image and the preprocessed floating image to obtain a registration result image. The output device 780 may be configured to output the obtained registration result image.

In an embodiment, the image registration apparatus 700 may optionally (thus shown in dashed boxes) include a resampling device 742 and a normalization device 744. The resampling device 742 may be configured to resample the reference image and the floating image so that the reference image and the floating image have the same pixel pitch. The normalization device 744 may be configured to normalize the reference image and the floating image. In an embodiment, the image registration apparatus 700 may further optionally include an adaptive cropping device 748. The adaptive cropping device 748 may be configured to perform adaptive cropping on the reference image and the rigidly registered floating image.

Referring to FIG. 7, the rigid registration device 746 may further include an iterative closest point registration module, a mutual information registration module, an image registration module, and optionally an extraction module and an iteration module. The iterative closest point registration module may be configured to perform coarse registration about contour point data sets on a reference image and a floating image to be registered by using iterative closest point registration, so as to obtain first transformation parameters. The mutual information registration module may be configured to optimize registration between the reference image and the floating image by using mutual information registration based on the obtained first transformation parameters, so as to obtain second transformation parameters. The image registration module may be configured to register the reference image and the floating image based on the obtained second transformation parameters. The extraction module may be configured to extract respective contour point data sets of the reference image and the floating image to be registered. The iteration module may be configured to repeatedly perform operations of the iterative closest point registration module and the mutual information registration module through stochastic gradient descent a predetermined number of times or until a calculated mutual information value converges.

In addition, the non-rigid registration device 760 may further include a U-Net module, an STN module, a loss function value calculation module, and an iteration module. The U-Net module may be configured to input a preprocessed reference image and a preprocessed floating image to a U-Net to obtain spatial transformation parameters. The STN module may be configured to input the obtained spatial transformation parameters to a spatial transformation network (STN), and perform spatial transformation and an interpolation operation on the preprocessed floating image, so as to obtain a registration result image. The loss function value calculation module may be configured to calculate a loss function value between the obtained registration result image and the reference image by using a loss function. The iteration module may be configured to repeat various operations of non-rigid registration while training a non-rigid registration model, until the non-rigid registration model converges or a predetermined number of times of iterative training has been performed.

According to an embodiment of the present disclosure, a computer-readable medium is further provided, having instructions thereon, and when executed by a processor, the instructions cause the processor to perform the steps of the method of the present disclosure. The computer-readable medium may include, but not limited to, a non-transitory, tangible arrangement of an article manufactured or formed by a machine or apparatus, including a storage medium such as the following: a hard disk; any other type of disk including a floppy disk, an optical disk, a compact disk read-only memory (CD-ROM), a compact disk rewritable (CD-RW), and a magneto-optical disk; a semiconductor device such as a read-only memory (ROM), a random access memory (RAM) such as a dynamic random access memory (DRAM) and a static random access memory (SRAM), an erasable programmable read-only memory (EPROM), a flash memory, and an electrically erasable programmable read-only memory (EEPROM); a phase change memory (PCM); a magnetic or optical card; or any other type of medium suitable for storing electronic instructions. The computer-readable medium may be installed in a CT apparatus, or may be installed in a separate control apparatus or computer that remotely controls the CT apparatus.

Figure 8:
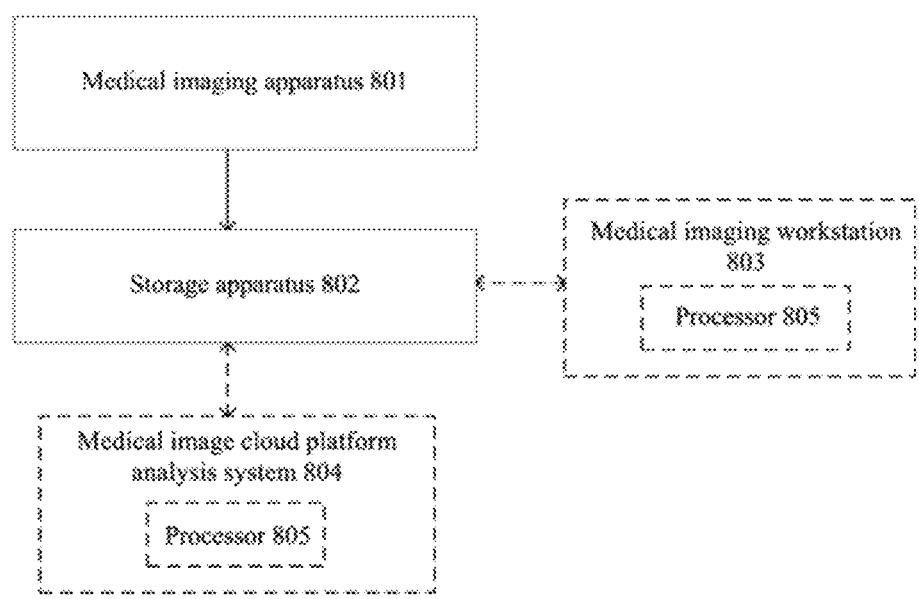
FIG. 8 schematically shows an exemplary block diagram of a system for image registration according to an embodiment of the present disclosure.

FIG. 8 shows a block diagram of an exemplary system 800 for image registration according to an embodiment of the present disclosure. Referring to FIG. 8, the system 800 may include a medical imaging apparatus 801 configured to perform an imaging scan to generate a medical image, a storage apparatus 802 configured to store the medical image, and a medical imaging workstation 803 or a medical image cloud platform analysis system 804 communicatively connected to the storage apparatus 802 and including a processor 805. The processor 805 may be configured to perform various methods described herein.

The medical imaging apparatus 801 may be a CT apparatus, an MRI apparatus, a C-arm imaging apparatus, a PET apparatus, a SPECT apparatus, or any other suitable imaging apparatus. The storage apparatus 802 may be located in the medical imaging apparatus 801, in a server external to the medical imaging apparatus 801, in a stand-alone medical image storage system (such as a PACS), and/or in a remote cloud storage system. The medical imaging workstation 803 may be disposed locally to the medical imaging apparatus 801, while the medical image cloud platform analysis system 804 may be located remotely from the medical imaging apparatus 801, for example, at a cloud in communication with the medical imaging apparatus 801. As an example, after a medical institution completes an imaging scan using the medical imaging apparatus 801, the data obtained from the scan is stored in the storage apparatus 802; the medical imaging workstation 803 may directly read the data obtained from the scan and perform image registration using the method of the present disclosure through the processor thereof. As another example, the medical image cloud platform analysis system 804 may read medical images in the storage apparatus 802 through remote communication so as to provide the "software as a service (SAAS)." The SAAS may exist between hospitals, between a hospital and an imaging center, or between a hospital and a third-party online medical service provider.

The technology described in the present disclosure may be implemented at least in part through hardware, software, firmware, or any combination thereof. For example, aspects of the technology may be implemented through one or a plurality of microprocessors, digital signal processors (DSPs), application-specific integrated circuits (ASICs), field programmable gate arrays (FPGAs), or any other equivalent integrated or discrete logic circuits, and any combination of such parts embodied in a programmer (such as a doctor or patient programmer, a stimulator, or other apparatus). The term "processor", "processing circuit", "controller" or "control module" may generally refer to any of the above noted logic circuits (either alone or in combination with other logic circuits), or any other equivalent circuits (either alone or in combination with other digital or analog circuits).

Example 1 is an image registration method. The method may include: obtaining a reference image and a floating image to be registered; performing image preprocessing on the reference image and the floating image, wherein the image preprocessing may include rigid registration based on iterative closest point registration and mutual information registration; performing non-rigid registration on the preprocessed reference image and the preprocessed floating image to obtain a registration result image; and outputting the registration result image.

Example 2 includes the method defined in Example 1, wherein the rigid registration based on iterative closest point registration and mutual information registration may further include: performing coarse registration about contour point data sets on the reference image and the floating image to be registered by using iterative closest point registration, so as to obtain first transformation parameters; optimizing registration between the reference image and the floating image by using mutual information registration based on the first transformation parameters, so as to obtain second transformation parameters; and registering the reference image and the floating image based on the second transformation parameters.

Example 3 includes the method defined in Example 2, wherein a contour point data set of each of the reference image and the floating image may be extracted through a marching cubes algorithm.

Example 4 includes the method defined in Example 2 or 3, wherein the mutual information registration may further include: performing spatial transformation on the floating image by using the first transformation parameters as initial values of the mutual information registration; performing an interpolation operation on the spatially transformed floating image; and calculating a mutual information value between an obtained interpolation result and the reference image, so as to obtain the second transformation parameters corresponding to the mutual information value.

Example 5 includes the method defined in Example 4, wherein the spatial transformation may include one or more of a translation operation of the floating image in an x-axis direction, a translation operation in a y-axis direction, a translation operation in a z-axis direction, a rotation operation in an axial plane, a rotation operation in a sagittal plane, and a rotation operation in a coronal plane.

Example 6 includes the method defined in Example 4, wherein the interpolation operation may include one or more of nearest neighbor interpolation, partial volume interpolation, linear interpolation, B-spline interpolation, bilinear interpolation, and bicubic interpolation.

Example 7 includes the method defined in Example 4, wherein the optimization may further include: repeating the iterative closest point registration and the mutual information registration through stochastic gradient descent a predetermined number of times or until the mutual information value converges.

Example 8 includes the method defined in any example of Examples 2 to 7, wherein each of the first transformation parameters and the second transformation parameters may include: a pixel translation amount in an x-axis direction, a pixel translation amount in a y-axis direction, a pixel translation amount in a z-axis direction, a central rotation angle in an axial plane, a central rotation angle in a sagittal plane, and a central rotation angle in a coronal plane; or a pixel translation amount in an x-axis direction, a pixel translation amount in a y-axis direction, and a central rotation angle in an xy plane.

Example 9 includes the method defined in any example of Examples 1 to 8, wherein the image preprocessing may further include: resampling the reference image and the floating image before the rigid registration based on iterative closest point registration and mutual information registration is performed, so that the reference image and the floating image have the same pixel pitch.

Example 10 includes the method defined in any example of Examples 1 to 9, wherein the image preprocessing may further include: normalizing the reference image and the floating image by using the same normalization equation before the rigid registration based on iterative closest point registration and mutual information registration is performed.

Example 11 includes the method defined in any example of Examples 1 to 10, wherein the image preprocessing may further include: performing adaptive cropping on the reference image and the floating image after the rigid registration based on iterative closest point registration and mutual information registration is performed.

Example 13 includes the method defined in Example 11, wherein the adaptive cropping may further include: positioning a contour of a target object in the reference image and the rigidly registered floating image through a semi-automatic or automatic segmentation method; performing an opening operation on the contour to remove isolated points; calculating a minimum bounding box of the contour subjected to the opening operation; and automatically expanding the minimum bounding box to a desired size, so as to obtain a reference image and a floating image that are cropped based on the desired size, wherein the desired size enables the cropped reference image and floating image to be suitable for input to a model for performing the non-rigid registration.

Example 13 includes the method defined in any example of Examples 1 to 12, wherein the image preprocessing may be performed on the reference image and the floating image at the same time.

Example 14 includes the method defined in any example of Examples 1 to 13, wherein the non-rigid registration may further include: inputting the preprocessed reference image and the preprocessed floating image to the U-Net to obtain spatial transformation parameters; and inputting the spatial transformation parameters to the spatial transformation network, and performing spatial transformation and an interpolation operation on the preprocessed floating image, so as to obtain the registration result image.

Example 15 includes the method defined in Example 14, wherein the spatial transformation may include translation operations of pixels of the floating image in an x-, y- and/or z-axis direction.

Example 16 includes the method defined in Example 14 or 15, wherein the interpolation operation may be bilinear interpolation.

Example 17 is a rigid registration method for images based on iterative closest point registration and mutual information registration. The method may comprise: performing coarse registration about contour point data sets on a reference image and a floating image to be registered by using iterative closest point registration, so as to obtain first transformation parameters; optimizing registration between the reference image and the floating image by using mutual information registration based on the first transformation parameters, so as to obtain second transformation parameters; and registering the reference image and the floating image based on the second transformation parameters.

Example 18 includes the method defined in Example 17, wherein a contour point data set of each of the reference image and the floating image may be extracted through a marching cubes algorithm.

Example 19 includes the method defined in Example 17 or 18, wherein the mutual information registration may further include: performing spatial transformation on the floating image by using the first transformation parameters as initial values of the mutual information registration; performing an interpolation operation on the spatially transformed floating image; and calculating a mutual information value between an obtained interpolation result and the reference image, so as to obtain the second transformation parameters corresponding to the mutual information value.

Example 20 includes the method defined in Example 19, wherein the spatial transformation may include one or more of a translation operation of the floating image in an x-axis direction, a translation operation in a y-axis direction, a translation operation in a z-axis direction, a rotation operation in an axial plane, a rotation operation in a sagittal plane, and a rotation operation in a coronal plane.

Example 21 includes the method defined in Example 19, wherein the interpolation operation may include one or more of nearest neighbor interpolation, partial volume interpolation, linear interpolation, B-spline interpolation, bilinear interpolation, and bicubic interpolation.

Example 22 includes the method defined in Example 19, wherein the optimization may further include: repeating the iterative closest point registration and the mutual information registration through stochastic gradient descent a predetermined number of times or until the mutual information value converges.

Example 23 includes the method defined in any example of Examples 17 to 22, wherein each of the first transformation parameters and the second transformation parameters may include: a pixel translation amount in an x-axis direction, a pixel translation amount in a y-axis direction, a pixel translation amount in a z-axis direction, a central rotation angle in an axial plane, a central rotation angle in a sagittal plane, and a central rotation angle in a coronal plane; or a pixel translation amount in an x-axis direction, a pixel translation amount in a y-axis direction, and a central rotation angle in an xy plane.

Example 24 includes the method defined in any example of Examples 17 to 23, wherein the reference image and the floating image may be resampled before the iterative closest point registration, so that the reference image and the floating image have the same pixel pitch.

Example 25 includes the method defined in any example of Examples 17 to 24, wherein the reference image and the floating image may be normalized by using the same normalization equation before the iterative closest point registration.

Example 26 is a method for training a non-rigid registration model for images. The method may include: (a) inputting a preprocessed reference image and a preprocessed floating image to a U-Net to obtain spatial transformation parameters; (b) inputting the spatial transformation parameters to a spatial transformation network, and performing spatial transformation and an interpolation operation on the preprocessed floating image, so as to obtain a registration result image; (c) calculating a loss function value between the reference image and the registration result image by using a loss function, wherein the loss function may include both a correlation coefficient and a mean squared error between the reference image and the registration result image; and (d) repeating steps (a) to (c) until the non-rigid registration model converges or a predetermined number of times of iterative training has been performed.

Example 27 includes the method defined in Example 26, wherein the spatial transformation may include translation operations of pixels of the floating image in an x-, y- and/or z-axis direction.

Example 28 includes the method defined in Example 26 or 27, wherein the interpolation operation may be bilinear interpolation.

Example 29 is a computer-readable medium, having instructions thereon, wherein when executed by a processor, the instructions cause the processor to perform the steps of any of the methods described above.

Example 30 is an image registration apparatus, wherein the image registration apparatus may include a device for implementing the steps of any of the methods described above.

Example 31 is a system for image registration. The system may include: a medical imaging apparatus, the medical imaging apparatus being configured to perform an imaging scan to generate a medical image; a storage apparatus, the storage apparatus being configured to store the medical image; and a medical imaging workstation or a medical image cloud platform analysis system, wherein the medical imaging workstation or the medical image cloud platform analysis system may be communicatively connected to the storage apparatus and include a processor, the processor may be configured to perform the steps of any of the methods described above.

Some exemplary embodiments of the present disclosure have been described above. However, it should be understood that various modifications can be made to the exemplary embodiments described above without departing from the spirit and scope of the present disclosure. For example, an appropriate result can be achieved if the described techniques are performed in a different order and/or if the components of the described system, architecture, apparatus, or circuit are combined in other manners and/or replaced or supplemented with additional components or equivalents thereof; accordingly, the modified other embodiments also fall within the protection scope of the claims.

The invention claimed is:

1. A method for training a non-rigid registration model for images, comprising:
   (a) inputting a preprocessed reference image and a preprocessed floating image to a U-Net to obtain spatial transformation parameters, wherein the preprocessed reference image is obtained using rigid registration based on an iterative closest point registration and a mutual information registration, wherein rigid registration includes performing coarse registration about contour point data sets on the preprocessed reference image and the preprocessed floating image to be registered by using iterative closest point registration, and a contour point data set of each of the preprocessed reference image and the preprocessed floating image is extracted through a marching cubes algorithm;
   (b) inputting the spatial transformation parameters to a spatial transformation network, and performing spatial transformation and an interpolation operation on the preprocessed floating image, so as to obtain a registration result image;
   (c) calculating a loss function value between the preprocessed reference image and the registration result image by using a loss function, wherein the loss function comprises both a correlation coefficient and a mean squared error between the preprocessed reference image and the registration result image; and
   (d) repeating steps (a) to (c) a predetermined number of times for iterative training or until the non-rigid registration model converges.

2. The method according to claim 1, wherein the spatial transformation comprises translation operations of pixels of the preprocessed floating image in an x-, y- and/or z-axis direction.

3. The method according to claim 1, wherein the interpolation operation is bilinear interpolation.

* * * * *